United States Patent Office 3,314,899
Patented Apr. 18, 1967

3,314,899
POLYMERIC DIAZADIPHOSPHETIDINE DIOXIDES
Leo P. Parts and Morris L. Nielsen, Dayton, Ohio, assignors to Monsanto Research Corporation, St. Louis, Mo., a corporation of Delaware
No Drawing. Filed Nov. 26, 1963, Ser. No. 326,212
11 Claims. (Cl. 260—2)

This invention relates to polymeric heterocyclic compounds and more particularly provides new and valuable polymeric diazadiphosphetidine dioxides, the method of preparing the same, and very thermally stable, rigid polymers to which said polymeric dioxides are converted.

It is known that monomeric 1,3,2,4-diazadiphosphetidine-2,4-dioxides having an aryl substituent at each nuclear nitrogen atom and an arylamino substituent at each nuclear phosphorus atom are obtained by heating secondary phosphoric acid arylamides. Thus, upon heating N,N',N''-triphenylphosphoric triamide, Buck et al., J. Amer. Chem. Soc., 70, 2398–2400 (1948), obtained 2,4-dianilino-1,3-diphenyl-1,3,2,4-diazadiphosphetidine-2,4-dioxide:

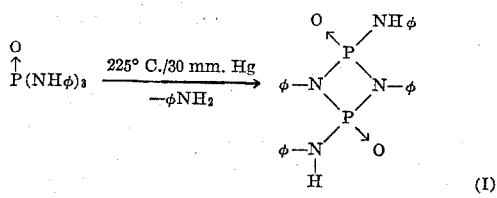

where φ denotes phenyl.

The compound (I), obtained by Buck et al. in 94 percent yield of theory, and melting at 357–359° C., was reconverted to the N,N',N''-triphenylphosphoric triamide by boiling it with aniline.

The compound (I), M.P. 357° C., had previously been reported by A. Michaelis and E. Silberstein, Berichte, 29, 716–728 (1896), who named it "oxyphosphazobenzolanilid," though assigning (page 728) to it the structure (I). They obtained it in 90 percent theoretical yield by long heating of phosphoryl chloride with aniline in xylene at 150° C., and also reported that the reaction progressed through formation of the mono-, di- and trianilides with the end product being (I). Products of the Formula I, but having one or more lower alkyl substituents at the phenyl radicals were obtained similarly from phosphoryl chloride and nuclearly alkylated anilines, or by reaction of an appropriate mono- or di-anilide with additional amine, or by thermal decomposition of the triamide. In 1895, P. Otto, Berichte 28, 616 (1895), had reported similar work with nuclearly halogenated aniline, and subsequent confirmation of the formation and existence of the compound (I) and of the alkyl and halogen derivatives was provided in later papers by Michaelis in Annalen 326, 129 (1902) and Annalen 407, 290 (1915).

The 2,4-bis(arylamino)-1,3-diaryl-1,3,2,4-diazadiphosphetidine-2,4-dioxides, i.e., compounds having the structure (I) wherein the phenyl groups may or may not be substituted by alkyl have been of theoretical interest owing to the four-membered-P-N-ring structure, the heat-stability and comparative insolubility of the compounds, the formation of the compounds either from phosphoryl chloride and a primary aromatic amine or from said amine and the mono- or dianilide, or by thermal decomposition of the trianilide, and to the easy reconversion of the type (I) compounds by heating them with the primary amine to give the starting trianilide. However, they have been of little, if any, practical importance.

Now we have found surprisingly, that the 2,4-bis(arylamino)-1,3-diaryl - 1,3,2,4 - diazadiphosphetidine-2,4-dioxides can be homocondensed to give valuable solid, cross-linked polymers by heating them at above 300° C. while removing volatilized by-product aromatic amine. The condensation with evolution of primary aromatic amine to give a cross-linked polymer, substantially according to the scheme:

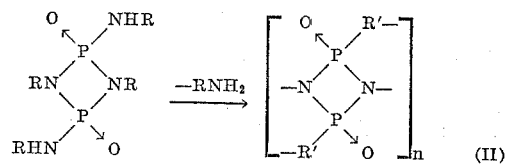

wherein R is a monocyclic aromatic hydrocarbon radical of from 6 to 12 carbon atoms, free of olefinic and acetylenic unsaturation, possessing at least one hydrogen atom at the nucleus, and linked through nuclear carbon to the remainder of the molecule, R' is R less one hydrogen atom at the nucleus, and n denotes the degree of polymerization. The products formed are cross-linked polymers containing the above-depicted recurring unit. Upon further heating in an inert atmosphere, the polymers are converted to more highly cross-linked products.

The presently useful componds include 2,4-dianilino-1, 3-diphenyl - 1,3,2,4-diazadiphosphetidine - 2,4-dioxide as well as derivatives thereof in which the phenyl group is substituted by lower alkyl radicals which may possess a total of up to 6 carbon atoms, e.g., the 2,4-bis(o-, m- or p-tolylamino)-1,3-bis(o-, m- or p-tolyl)-, the 2,4-bis[(o-, m- or p-isopropylphenyl)amino]-1,3-bis(o-, m- or p-isopropylphenyl-, the 2,4-bis[(o,- m- or p-hexylphenyl) amino]-1,3-bis(o-, m- or p-hexylphenyl)-, the 2,4-bis (mesitylamino)-1,3-dimesityl-, the 2,4-bis[(tetramethylphenyl)amino]-1,3-bis(tetramethylphenyl)- or the 2,4-bis]2,3-diethylphenyl)amino] - 1,3-bis(2,3 - diethylphenyl)-1,3,2,4-diazadiphosphetidine-2,4-dioxide.

In conducting the reaction, it is not necessary to start with the 2,4-bis(arylamino)-1,3-diaryl-1,3,2,4-diazadiphosphetidine-2,4-dioxide. Instead, the starting material conveniently may be a mixture of phosphoryl chloride and the appropriate primary aromatic amine or it may be any of the arylamides obtainable by heating said chloride with said amine, since upon heating either the mixture or any of the amides, there occurs conversion to a compound of the structure (I), i.e., the 2,4-bis(arylamino)-1,3-diaryl-1,3,2,4-diazadiphosphetidine-2,4-dioxide. This is well brought out in the paper by Michaelis and Silberstein referred to above. At the top of page 718, they say, "Thus, by the reaction of phosphoryl chloride with aniline or aniline hydrochloride one can obtain not one, but four different compounds. The first reaction product is always the primary N-oxychlorophosphine, $C_6H_5NHPOCl_2$; then follows the secondary compound $(C_6H_5NH)_2POCl$, together with the tertiary phosphine oxide $(C_6H_5NH)_3PO$, with the end product in all cases being the oxyphosphazobenzoanilid." Structure (I) was assigned to the latter.

Irrespective of whether the starting material for preparation of the presently provided cross-linked polymers be the diazadiphosphetidine dioxide, i.e., compound (I) or one in which phenyl carries a lower alkyl substituent, or a precursor thereof such as one or more of the aryl phosphoric amides, or the mixture of phosphoryl halide and primary aromatic amine from which such amides are formed, the conditions employed should include those which effect homocondensation of the said dioxide to the polymer. Starting with the phosphoryl halide and the primary amine simply permits preparation of the present polymers without isolating either the intermediately formed amides or the dioxide. Starting with the triamide simply eliminates the need of isolating the dioxide. When starting with the triamide, the temperature is advantageously maintained at, say, 200° C. to 300° C. to convert the triamide to the dioxide. It is only after the dioxide has been formed that provision is made by increasing the temperature, for converting the dioxide into the polymer. Since the dioxide is known to react with a primary amine by becoming reconverted to the triamide, care should be observed to assure that the dioxide is free of amine before increasing the reaction temperature for preparation of the polymer.

As hereinbefore disclosed, conversion of the dioxide to the polymer takes place by heating the former at a temperature of from 300° C. to 800° C. while removing the by-product aniline from the reaction zone. When starting from phosphoryl chloride and the aromatic amine, e.g., aniline, the two reactants are heated in substantially the stoichiometric proportions required for triamide formation at, say, a temperature of from 80° C. to 150° C., advantageously in the presence of an inert, organic liquid diluent. The by-product hydrohalide which is formed in the amidation may be removed by using a hydrogen halide scavenger or by dephlegmation, and the diluent, if any, may be distilled off. Continued heating of the amide thus formed, while allowing the volatilized aniline to distill off or to collect in a cooled trap, converts the amide to 2,4-bis(arylamino)-1,3-diaryl-1,3,2,4-diazadiphosphetidine-2,4-dioxide, e.g., the phenyl compound (I), which solidifies upon cooling. The dioxides are thermally stable, and in absence of means of facilitating removal of primary aromatic amine, they may be heated to their melting points without conversion to polymer. However, if heating is conducted while evacuating or passing an inert gas through the reaction chamber, conversion to polymer occurs below the melting points of the dioxides, the equilibrium apparently being shifted by providing for elimination of the primary amine. Heating of the dioxides at a temperature of 300° C. while removing the amine initiates the homocondensation of the dioxide to give the present polymers. Application of vacuum or a constant stream of an inert gas serves to remove the amine from the reaction zone. The conversions proceed slowly; hence, although long heating at, say, 300° C. to 340° C., will result in complete conversion to polymer so long as the by-product amine is being removed, in order to reduce the reaction time, heating at over 340° C. is advantageous. Also, although temperatures as high as 800° C. result in formation of the polymer, as the temperature increases to, say over 450° C., and depending upon the heating rate, the polymer gradually becomes further cross-linked with evolution of hydrogen. Provision for eliminating aniline from the reaction zone should be made even when operating at or above the melting point of the dioxides; otherwise, the dioxides appear simply to melt without evidence of polymer formation. Optimum conditions for conversion to polymer comprise heating the dioxide at from, say, 360° C. to 450° C. while removing by-product amine from the reaction zone; and although after the polymer has melted, provision need be made only for permitting the volatized amine to distill off, it is advantageous, for reducing reaction time, to employ evacuation or to work in a stream of inert gas even at these higher temperatures. Although conversion of the dioxide to polymer increases with increasing temperature within the 300° C. to 450° C. range, in experimental runs it is recommended that heating be initiated at the lower limits of this range. Otherwise, not only may there be presented the problem of removing large quantities of amine before the latter has opportunity to react with the dioxide for reformation of the triamide, but also the dioxide may tend to sublime and thereby hinder removal of the volatized amine. Decreased conversion to polymer results. The optimum temperature will depend, of course, upon the quantity of dioxide employed and the relationship of that quantity to the size of the reaction vessel and means employed for removing the by-product amine therefrom, and can be arrived at by routine experimentation. However, even though heating is initiated at about 300° C., provisions for satisfactory removal of amine can generally permit a rapid temperature increase, say, at the rate of from 1 to 5° C. per minute. Thereby, the reaction time can be significantly reduced. Operating in this manner, conversion to polymer is substantially complete when a temperature of, say, 420° C. has been attained. Although, during the heating, the solid, crystalline dioxide is converted into the liquid, molten state, as homocondensation to polymer proceeds, the liquid changes to the solid, non-crystalline polymer.

Depending upon the reaction conditions, the polymer may be glassy or porous. Rapid heating will result in foaming, with consequent porosity of product. Also, when an initially formed, light colored, glassy polymer is heated at a temperature which is substantially above, say, 500° C., partial degradation of the polymer begins with a weight loss which indicates hydrogen abstraction accompanied by further cross-linking of the polymer. As a result, the glassy polymer begins to darken, the darkening increasing with rise in temperature. For example, heating a glassy, light tan polymer from 450° C. to 800° C. in an inert atmosphere results in a weight loss of only 4 percent. At this point, the polymer, though black rather than light colored, is still rigid and insoluble. It undergoes no further weight loss upon cooling and reheating to 800° C. Similarly, when the light polymer is heated to an intermediate temperature, say, 600° C., cooling and subsequent heating of that polymer at 600° C. does not affect it.

The invention thus provides not only the polymeric diazadiphosphetidine dioxides which are obtained by the homocondensation of a 2,3-diarylamino-1,3-diaryl-1,3,2,4-diazadiphosphetidine-2,4-dioxide at 300° C. to 450° C., but also the solid, thermally stable, insoluble materials which are obtained by heating said polymeric diazadiphosphetidine dioxides to a temperature of 800° C. Heating to 800° C. thus provides a means of decreasing the degradation point of the polymers obtained at 300° C. to 450° C.

Both the polymeric diazadiphosphetine dioxides and the improved, thermally stable polymers obtained therefrom are rigid solids which do not soften upon heating to 800° C. and which are insoluble in substantially all generally known solvents. The polymeric dioxides are hydrolyzed by prolonged digestion with concentrated hydrochloric acid at elevated temperatures. Compression molding presents a problem in that the standard molding equipment cannot be used with them, and electrically heated, hardened steel anvils, e.g., Bridgman apparatus for use at very high temperatures, need be employed at extremely high pressures, say, at pressures which may be up to 30,000 kg./cm.$^2$. The necessity of using specially devised, high pressure molding apparatus is compensated for, of course, by the very unusual thermal properties of the molded pieces.

Advantageous utilization of the present polymers is in fields wherein they can be prepared in situ, i.e., in surface coatings applications whereby a solution of the triarylphosphoric triamide or of the 2,3-diarylamino-1,3-diaryl-1,3,2,4-diazadiphosphetidine-2,4-dioxide, say, a solution of N,N',N''-triphenylphosphoric triamide in xylene or a solution of 2,3-anilino-1,3-diphenyl-1,3,2,4-diazadiphosphetidine-2,4-dioxide in quinoline is brushed or sprayed onto a metal surface or other thermally stable substrate and baked to give an adherent, thermally stable coating upon the substrate, the baking being conducted at a temperature of 300°–450° C. with removal of by-product aniline, e.g., by employing a vacuum oven, for formation of the polymeric diazadiphosphetidine dioxide. If the coated metal is designed for use at temperatures below 500° C., no further treatment is required since the tough, smooth and well-bonded film of said polymer dioxide neither softens nor is degraded by temperatures of up to 500° C. and is highly solvent-resistant. If the coated metal is to be used at higher temperatures, then the coating is conditioned to withstand the maximum temperature, up to 800° C., by heating the coated metal to that temperature. Thus, when the contemplated use requires subjecting it to, say, a maximum temperature of 600° C., the coating is conditioned to withstand temperatures of up to that degree by baking the coated metal to that temperature. Cooling and subsequent heating to 600° C. will not affect the coating.

Particularly valuable are the intensely black coatings obtained when the baking temperature is carried to 800° C. Such coatings are strong absorbers of optical radiation, being therefore useful in the construction of bimetallic junctions for thermoelectric conversion devices. The coatings are heat absorbers, generally. The present polymers are especially valuable as coatings for radiators of high-temperature, thermoelectric devices wherein efficacy of operation depends upon attainable temperature differentiation. They are also useful as coatings for components of fuel cells using molten salts as electrolytes, in the fabrication of thermionic apparatus, etc.

*Example 1*

Employing thermogravimetric apparatus (American Instrument Company thermograph), 0.2 mg. samples of N,N',N''-triphenylphosphoric amide were heated to 300° C., 500° C. and 800° C., respectively. The rate of temperature rise was 3° C./minute, and during the heating the system was flushed with 20 cc. of helium/minute. The sample which had been heated to 300° C. was found to have undergone a weight loss of 29.5%. The residue was found to be substantially pure 2,4-dianilino-1,3-diphenyl-1,3,2,4-diazadiphosphetidine-2,4-dioxide, a colorless crystalline solid which analyzed as follows:

Found, percent: C, 62.56; H, 4.97; N, 12.29; P, 13.61. Calc'd for $C_{24}H_{22}N_4P_2$: C, 62.61; H, 4.82; N, 12.17; P, 13.46.

That which had been heated to 500° C., was a polymeric, light tan, rigid foam consisting essentially of the repeating unit

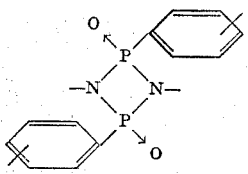

It analyzed as follows:

Found percent: C, 52.76; H, 3.15; N, 9.64; P, 21.04. Calc'd for $C_{12}H_4O_2P_2N_2$: C, 52.57; H, 2.94; N, 10.22; P, 22.60.

Thermogravimetric study showed that complete conversion to the polymer, as denoted by flattening of the downward weight-loss curve, had occurred by 425° C, initiation of the homocondensation reaction as evidenced by weight, having occurred at about 335° C. Here, operation under conditions required for thermogravimetric analysis permitted conversion at a temperature below the 357–360° C. melting point temperature of the diazadiphosphetidine dioxide at atmospheric pressure.

As the above analysis shows, the polymeric product is stable at 500° C., i.e., the elemental analysis of the product obtained at 500° C. agrees well with the theo-recital. The sample which had been heated to 500° C. had decreased in weight by 67.15%, which loss represented the aniline evolved in conversion of the N,N',N''-triphenylphosphoric amide to 2,4-dianilino-1,3-diphenyl-1,3,2,4-diazadiphosphetidine-2,4-dioxide, and also the loss in aniline resulting from conversion of said dioxide to polymer.

The sample which had been heated to 800° C. was an intensity black, rigid foam. The weight loss, based on the starting triamide was only 4.0% greater than the weight loss which resulted from heating to 500° C. The black product analyzed as follows:

| | Percent |
|---|---|
| Carbon | 52.10 |
| Hydrogen | 0.83 |
| Nitrogen | 10.22 |
| Phosphorus | 22.60 |

As compared with the analysis for the 500° C., polymer, the 800° C. polymer showed mainly loss in hydrogen, about 75 percent H having been lost during the heating from 500° C. to 800° C. Heating to above 800° C. leads to extensive degradation.

Both the 500° C. polymer and the 800° C. polymer were insoluble in all solvents that were tested, including quinoline, and softening points for neither polymer could be obtained at ordinary pressure. However, fusion of the former occurs at high pressures, so it is readily moldable. Thus a sample of the polymer gave a smooth, coherent well-dimensioned, solid object when molded at 14,000 p.s.i. and a maximum temperature of 414° C.

*Example 2*

N, N', N''-triphenylphosphoric triamide, M.P. 213.9–215.5° C., was prepared substantially according to the procedure of L. F. Audrieth and A. D. F. Toy, J. Amer. Chem. Soc. 64 1553 (1942), employing 0.20 mole of phosphoryl chloride, 1.20 moles of aniline and 0.60 mole of pyridine in chloroform solution. It was converted into 2,4-dianilino-1,3-diphenyl-1,3,2,4 - diazadiphosphetidine-2,4-dioxide by heating it in the isoteniscope at 223° C. under vacuum, said dioxide beginning to solidify as by-product aniline distilled off. Heating was continued, with release of vacuum by introduction of nitrogen. At about 358° C., the solid material melted. Heating above the melting point while passing a stream of nitrogen through the system was continued to 365° C., during which time volatilized aniline was collected in a cooled trap and conversion of the 2,4 - dianilino - 1,3-diphenyl-1,3,2,4-diazadiphosphetidine-1,3-dioxide to polymeric product occurred. Continued heating of the light yellow, glassy solid polymer to 410° C. gave no further evolution of aniline and no other evidence of decomposition.

*Example 3*

To a flask which was connected to a liquid nitrogen-cooled trap there was charged 12.5 g., 38.66 mM., of N,N'N''-triphenylphosphoric amide. The system was evacuated and heat was applied. The triamide melted at 214° C. and at 224° C. rapid elimination of aniline occurred. After a total heating time of 1 hour and 10 minutes, with a maximum temperature of 230° C., all of the liquid had been converted to a solid. Heating at 220–230° C was then continued for 4 hours, at the end of which time aniline had ceased to collect in a cooled trap. Solid, crystalline 2,4 - dianilino - 1,3 - diphenyl-1,3,2,4-diazadiphosphetidine-1,3-dioxide remained in the flask. In order to employ it for the preparation of thermally resistant coatings, its solubility was tested. It was found to be insoluble in either hot dimethoxyethane or in acetonitrile, very slightly soluble in hot pyridine, slightly soluble in nitrobenzene (from which it recrystallized in long needles), and soluble in hot quinoline. The compound analyzed as follows:

Found, percent: C, 62.51; H. 4.70; N,12.22; P, 13.55. Calc'd for $C_{24}H_{22}N_4P_2O_4$: C, 62.61; H, 4.82; N, 12.17; P, 13.46.

A portion of the said 1,3-dioxide was transferred to a flask which was attached to a vacuum pump. Heating to 360° C. under vacuum resulted in rapid sublimation of the molten material although some homocondensation to polymer occurred.

Another portion of the said 1,3-dioxide was dissolved in hot quinoline. Brushing of the quinoline upon the surface of a test strip of copper sheeting and subsequent baking of the strip at a temperature of up to 450° C. in a stream of nitrogen gives a smooth, hard, tenuous light-tan coating upon the copper surface. The coating is unaffected by all the solvents tested above, including quinoline. Subsequent baking of the coated strip at up to 800° C. converts the coating to a black film which adheres to the copper strip and which, like the light-tan coating, is unattacked by any of the solvents, and is not degraded upon reheating to the 800° C. temperature.

When glass fiber textile is impregnated with a quinoline solution of the 2,4-dianilino-1,3-diphenyl-1,3,2,4-diazadiphosphetidine-1,3-dioxide and strips of the impregnated textile are arranged into a 3-tier laminate structure, baking of the assembly in a vacuum oven at 400–450° C. gives a tough rigid, well-bonded laminate.

A liquid coating comprising solution or dispersion of the said dioxide, admixed with carbon black or laminar graphite, applied to copper or aluminum sheeting and baked in a vacuum oven at 800° C. gives a copper or aluminum sheet having deposited upon the surface thereof a rough, pitted, intensely black, adherent coating. Radiators constructed of the coated metals are eminently suited as components of high temperature thermoelectric power-generating devices.

*Example 4*

N,N′,N″-triphenylphosphoric triamide (15.573 g., 0.0481 mole) contained in a wide test tube was heated to 425° C. while passing a stream of helium through the system. At this point vacuum was applied gently, in order to free the reaction mixture of aniline. Evaporation of volatile material at the beginning of the evacuation cooled the sample to 400° C. Heating was then continued for 1 hour at 400–425° C. The pale yellow liquid that was recovered from the trap which was attached to the reaction tube had $n_D^{25}$ 1.5840 and was identified as aniline by infrared spectrum. The spectrum also indicated absence of benzene in the liquid. A small amount of the intermediate product, 2,4-dianilino-1,3-diphenyl-1,3,2,4-diazadiphosphetidine-2,4-dioxide, identified spectroscopically, was evolved during the evacuation step and was deposited at cold portions of the apparatus. Upon completing the evacuation, there was obtained 5.835 g. (88.5% theoretical yield) of the light yellow, porous solid polymer which analyzed as follows:

Found, percent: C, 52.30; H, 3.68; N, 10.27; P, 22.20. Calc'd. for $C_6H_4NOP$: C, 52.57; H, 2.94; N, 10.22; P, 22.60.

X-ray diffraction analysis of the polymer showed it to be non-crystalline.

In place of the N,N′,N″-triphenylphosphoric triamide which is used as the starting material in this example, use of 2,4-dianilino-1,3-diphenyl-1,3,2,4-diazadiphosphetidine-2,4-dioxide as the starting material gives the same polymer. Also, instead of employing the N,N′,N″-triphenylphosphoric triamide or the intermediate therefrom, i.e., the 2,4-dianilino-1,3-diphenyl-1,3,2,4-diazadiphosphetidine-2,4-dioxide as the starting materials, the same procedure with other N,N′,N″-triarylphosphoric triamides or other 2,4-bis(arylamino)-1,3-diaryl-1,3,2,4-diazadiphosphetidine-2,4-dioxides, e.g., N,N′,N″-tri-m-tolylphosphoric triamide or 2,4-bis(m-tolylamino)-1,3-di-m-tolyl-1,3,2,4-diazadiphosphetidine-2,4-dioxide, or N,N′,N″-tris-(o-isoproplyphenyl)phosphoric triamide or 2,4-bis(o-isopropylphenylamino)-1,3-bis(o-isopropylphenyl)-1,3,2,4-diazadiphosphetidine-2,4-dioxide yields solid, resinous polymeric products having great resistance to heat and solvents.

*Example 5*

N,N′,N″-triphenylphosphoric triamide was charged to a flask connected to a vacuum pump through a trap, the flask with its contents was placed in a salt bath maintained at 258° C. and vacuum was applied. The triamide melted rapidly and evolution of aniline started. After a few hours, the bath temperature was lowered to 210° C. and it was noted that all of the triamide had been converted into the crystalline 2,4-dianilino-1,3-diphenyl-1,3,2,4-diazadiphosphetidine-2,4-dioxide. The reaction flask, with its contents, was then removed from the bath, and the bath temperature was raised to 360° C. The flask with its contents under nitrogen was then placed in the heated bath. Within about 12 minutes at 362° C., the entire contents of the flask was converted to a colorless liquid. After 30 minutes, during which time the bath temperature had been increased to 380° C., evacuation of by-product aniline was started. Vacuum was applied for one hour, with the temperature being allowed to fall to 340° C. within that time. During this period of evacuation, as the aniline was removed, the remaining material became more viscous; finally it was converted to the foamy, solid polymer consisting essentially of the repeating unit:

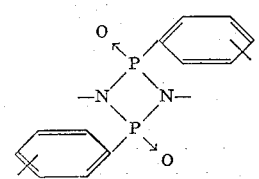

and analyzing 55.25% carbon and 10.96% nitrogen as against 55.9% and 10.22%, the respective calculated values for $C_{12}H_8O_2N_2P_2$, the empirical formula of the above-depicted unit.

The heat stability of the polymer was determined by heating it in a furnace at a temperature rise of 3° C./minute. There was no substantial loss in weight until the temperature had reached 500° C.

The above examples show use of the N,N′,N″-triarylphosphoric amides or of 2,4-bis(arylamino)-1,3-diphenyl-1,3,2,4-diazadiphosphetidine-2,4-dioxides as starting materials. The same types of polymeric products are obtained when the starting materials are mixtures of phosphoryl halide and a primary arylamine or the other precursors of the 2,4-bis(arylamino)-1,3-diaryl-1,3,2,4-diazadiphosphetidine-2,4-dioxides, i.e., the mono- and diamides formed from the said halide and said primary amine.

For comparative purposes, the homocondensation reactions described in the above examples, with the exception of the coatings illustrations, were conducted in absence of a solvent. However, starting either from the amide or from the 2,4-dioxide, the polymerizations can be conducted by dissolving or dispersing the reactant in an inert, organic liquid, e.g., acridine.

Since many apparently widely different embodiments of this invention may be made without departing from the spirit and scope thereof, the invention is not limited except as set forth in the following claims.

We claim:

1. A solid, cross-linked polymer consisting essentially of the repeating unit

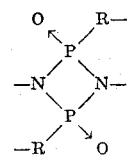

wherein R is a monocyclic aromatic hydrocarbon radical of from 6 to 12 carbon atoms, free of olefinic and acetylenic unsaturation, and linked through nuclear carbon to the remainder of the molecule.

2. A solid, cross-linked polymer consisting essentially of the repeating unit

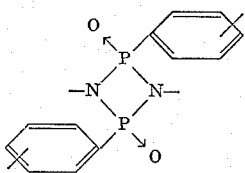

3. The method of preparing a solid, cross-linked polymer which comprises heating at from 300° C. to 800° C. a 2,4-bis(arylamino)-1,3-diaryl-1,3,2,4-diazadiphosphetidine-2,4-dioxide wherein aryl is monocyclic hydrocarbon, has from 6 to 12 carbon atoms and is free of olefinic and acetylenic unsaturation and is linked through nuclear carbon to the remainder of the molecule, said heating being conducted while removing by-product arylamine from the reaction chamber and, when the heating is conducted below the melting point of said dioxide, providing for so rapid a removal of the arylamine that chemical reaction of the amine in said chamber is substantially prevented.

4. The method defined in claim 3, further limited in that rapid removal of the arylamine is conducted by evacuating the reaction chamber.

5. The method defined in claim 3, further limited in that rapid removal of the arylamine is conducted by passing an inert gas through the reaction chamber.

6. The method of preparing a solid polymer having improved thermal stability, from a N,N',N''-triarylphosphoric triamide wherein the aryl radical is monocyclic hydrocarbon, has from 6 to 12 carbon atoms, is free of olefinic and acetylenic unsaturation and is linked through nuclear carbon to the remainder of the molecule which comprises heating the triamide while removing by-product aniline to obtain formation of 2,4-bis(arylamino)-1,3-diaryl-1,3,2,4-diazadiphosphetidine - 2,4 - dioxide wherein the aryl radical is as defined above, continue the heating to from 300° C. to 450° C. while continuing to remove by-product amine to obtain a solid polymer, and subsequently continue heating at a temperature of up to 800° C. in an inert atmosphere to obtain a polymer of improved thermal stability.

7. The method defined in claim 6, further limited in that the aryl radical is phenyl.

8. The method of increasing the thermal stability of a solid, cross-linked polymer consisting essentially of the repeating unit

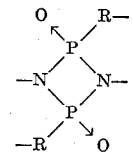

wherein R is a monocyclic aromatic hydrocarbon radical of from 6 to 12 carbon atoms, free of olefinic and acetylenic unsaturation, and linked through nuclear carbon to the remainder of the molecule which comprises heating the polymer at from 450° C. to 800° C. in an inert atmosphere.

9. The product obtained by the process of claim 8.

10. The method of improving the thermal stability of a solid, cross-linked polymer consisting essentially of the repeating unit

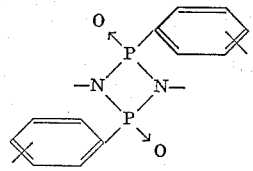

which comprises heating the polymer at from 450° C. to 800° C. in an inert atmosphere.

11. The method defined in claim 10, further limited in that the aryl group is phenyl.

References Cited by the Examiner

Buck et al.: "Jour. American Chemical Soc.," vol. 70 (1948), pp. 2398–2400.

SAMUEL H. BLECH, *Primary Examiner.*